US012556227B2

(12) United States Patent
Lu et al.

(10) Patent No.: US 12,556,227 B2
(45) Date of Patent: Feb. 17, 2026

(54) TRANSMITTER INCLUDING SELECTIVELY ENABLED CLOCK SOURCE BASED ON DIGITAL TRANSMIT DATA

(71) Applicant: QUALCOMM Incorporated, San Diego, CA (US)

(72) Inventors: Mu Lu, San Mateo, CA (US); Yi Zeng, San Jose, CA (US); Cheng-Han Wang, San Jose, CA (US); Ming-Tuo Chin, San Jose, CA (US); Chan Hong Park, San Jose, CA (US); Emanuele Lopelli, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 18/470,195

(22) Filed: Sep. 19, 2023

(65) Prior Publication Data

US 2025/0096842 A1 Mar. 20, 2025

(51) Int. Cl.
*H04B 1/7183* (2011.01)
*H04B 1/717* (2011.01)

(52) U.S. Cl.
CPC ......... *H04B 1/7183* (2013.01); *H04B 1/7174* (2013.01)

(58) Field of Classification Search
CPC .............................. H04B 1/7183; H04B 1/7174
See application file for complete search history.

(56) References Cited

U.S. PATENT DOCUMENTS

| 2011/0280338 | A1* | 11/2011 | Mochizuki | H04L 27/36 375/297 |
| 2015/0296452 | A1* | 10/2015 | Hu | H04W 52/0209 375/376 |
| 2022/0201603 | A1* | 6/2022 | Klein | H04L 27/0002 |
| 2022/0345288 | A1* | 10/2022 | Vorapipat | H04L 27/04 |
| 2024/0275394 | A1* | 8/2024 | Passamani | H03M 1/06 |

OTHER PUBLICATIONS

International Search Report and Written Opinion—PCT/US2024/043184—ISA/EPO—Nov. 15, 2024.
Olieman E., et al., "A Worldwide-compliant 802.15.4/4z IR-UWB RFDAC Transmitter in 28nm CMOS with 12dBm Peak Output Power", ESSCIRC 2023—IEEE 49th European Solid State Circuits Conference (ESSCIRC), IEEE, Sep. 11, 2023, pp. 61-64, XP034439540, Section I, Section II, Section III, Section III.C, figures 1,2,5,6.

* cited by examiner

*Primary Examiner* — Sam K Ahn
*Assistant Examiner* — Amneet Singh
(74) *Attorney, Agent, or Firm* — Loza & Loza LLP

(57) ABSTRACT

An apparatus, including: a clock source configured to generate a local oscillator (LO) clock signal; a radio frequency digital-to-analog converter (RF DAC) configured to generate a radio frequency (RF) signal based on a data signal and the LO clock signal; and an idle data detector configured to: detect a stream of idle data in the data signal; and disable providing the LO clock signal to at least a portion of the RF DAC in response to detecting the stream of idle data.

24 Claims, 5 Drawing Sheets

TRANSMITTER INCLUDING SELECTIVELY ENABLED CLOCK SOURCE BASED ON DIGITAL TRANSMIT DATA

FIELD

Aspects of the present disclosure relate generally to signal transmitters, and in particular, to a transmitter including selectively enabled clock source based on digital transmit data.

BACKGROUND

Some transmitters are implemented as a digital transmitter, where a radio frequency digital-to-analog converter (RF DAC) is employed to directly generate or synthesize an RF signal for transmission based on an input data signal at a sampling rate based on a local oscillator (LO) clock signal. The power consumption of such digital transmitters including the power consumed by the LO clock signal is of concern to achieving improved power efficiency for such transmitters.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a clock source configured to generate a local oscillator (LO) clock signal; a radio frequency digital-to-analog converter (RF DAC) configured to generate a radio frequency (RF) signal based on a data signal and the LO clock signal; and an idle data detector configured to: detect a stream of idle data in the data signal; and disable providing the LO clock signal to at least a portion of the RF DAC in response to detecting the stream of idle data.

Another aspect of the disclosure relates to a method. The method includes: generating a local oscillator (LO) clock signal; generating a radio frequency (RF) signal based on a data signal and the LO clock signal; detecting a stream of idle data in the data signal; and gating the LO clock signal to cease generating at least a portion of the RF signal in response to detecting the stream of idle data.

Another aspect of the disclosure relates to an apparatus. The apparatus includes: a modem configured to generate a physical layer ("phy") data signal; an ultra-wideband (UWB) pulse generator configured to generate a UWB signal based on the phy data signal and a first clock signal; a radio frequency digital-to-analog converter (RF DAC) configured to generate a radio frequency (RF) signal based on the UWB signal and a second clock signal; and a gating circuit configured to gate the second clock signal from being applied to the RF DAC in response to a pattern in the phy data signal.

Another aspect of the disclosure relates to an apparatus. The apparatus includes: a modem configured to generate a physical layer ("phy") data signal; an ultra-wideband (UWB) pulse generator configured to generate a UWB signal based on the phy data signal and a first clock signal, wherein the UWB signal comprises a set of significant bit groups; a set of radio frequency digital-to-analog converters (RF DACs) configured to generate a set of radio frequency (RF) signals based on the set of significant bit groups of the UWB signal and a second clock signal, respectively; an idle data detector configured to generate a set of control signals based on detecting a set of idle data stream in the set of significant bit groups, respectively; and a gating circuit configured to pass or gate the second clock signal to or from the set of RF DACs based on the set of control signals, respectively.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Some transmitters are implemented as a digital transmitter, where a radio frequency digital-to-analog converter (RF DAC) is employed to directly generate or synthesize an RF signal for transmission based on an input data signal. Such RF DAC digital transmitters generally deliver transmit power in a significantly more power efficient manner compared to traditional analog transmitters. Another advantage of such RF DAC digital transmitters is that there is no need for a baseband (BB) filter, which saves circuit footprint and reduces losses along the transmit chain. However, one drawback of such RF DAC digital transmitters is that the RF DAC is digitally driven by a high frequency (e.g., in the giga Hertz (GHz) range) local oscillator (LO) signal, which may consume significant power due to LO signal toggling.

Figure 1A:
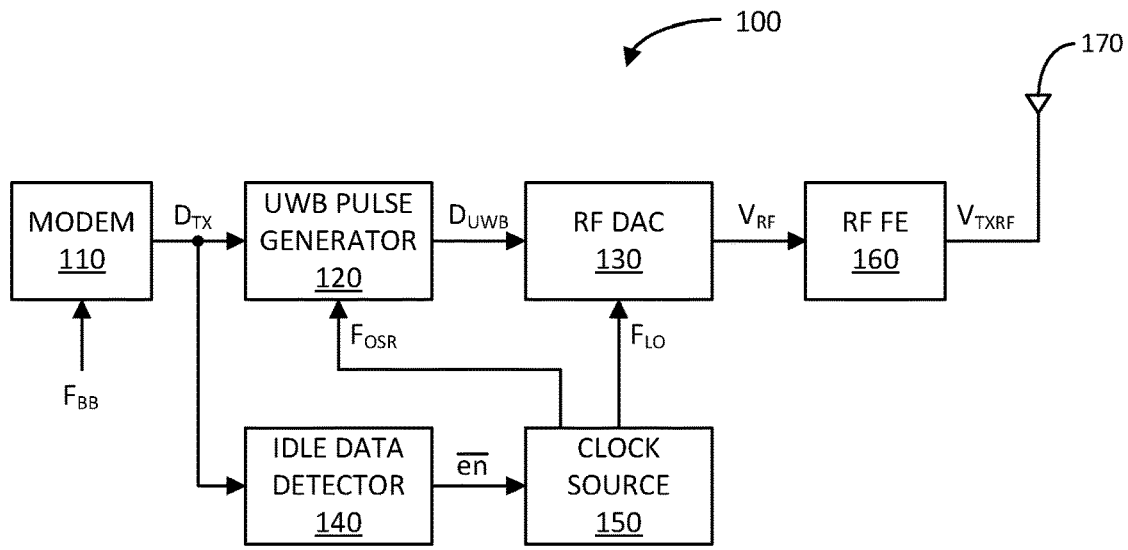
FIG. 1A illustrates a block diagram of an example transmitter in accordance with an aspect of the disclosure.

FIG. 1A illustrates a block diagram of an example transmitter 100 in accordance with an aspect of the disclosure. As discussed in more detail herein, the transmitter 100 is implemented with a radio frequency digital-to-analog converter (RF DAC) for direct synthesis of an RF signal based on a physical layer ("phy") data signal. In an example implementation, the transmitter 100 may be configured to generate an ultra-wideband (UWB) signal (e.g., UWB pulses) based on the phy data signal. Although for description purposes transmitters are a focal point of the disclosure, it shall be understood that the transmitters described herein may be implemented in a transceiver including an associated receiver.

With regard to UWB pulses, UWB connectivity is a short-range, wireless communication protocol that operates with a very high frequency as compared to other short-range wireless communication technologies (e.g., Bluetooth, wide local area network (WLAN), Zigbee, or the like), and uses a relatively wide frequency band (e.g., 500 MHz or greater) as compared to other short-range wireless communication technologies, which makes UWB useable for high-resolution positioning and localization purposes. In some cases, UWB technology may be used for location discovery, device ranging, or the like. In some cases, a UWB transmitter (e.g., the transmitter 100 and others described herein) may transmit numerous pulses across the wide spectrum frequency, and a corresponding UWB receiver (e.g., located at another UWB-enabled device) may translate the pulses into data.

More specifically, the transmitter 100 includes a modem 110, a UWB pulse generator 120 (for UWB implementations), an RF DAC 130, an idle data detector 140, a clock source 150 (e.g., a phase lock loop (PLL)-based clock source), an RF front end (RF FE) 160, and at least one antenna 170. The modem 110 is configured to generate a transmit phy data signal $D_{TX}$ based on a baseband (BB) clock signal $F_{BB}$ (e.g., at a data rate dictated or based on the frequency of the baseband clock signal $F_{BB}$). The UWB pulse generator 120 is configured to generate a UWB signal $D_{UWB}$ including UWB pulses based on the phy data signal $D_{TX}$ at an oversampling rate (OSR) dictated by or based on a clock signal $F_{OSR}$ generated by the clock source 150. As an example, the data rate of the phy data signal $D_{TX}$ may be at 500 megabits per second (Mbps), and the oversampling clock signal $F_{OSR}$ may be at four (4) giga Hertz (GHz).

The RF DAC 130 is configured to generate an RF signal $V_{RF}$ based on the UWB signal $D_{UWB}$ at a sampling rate dictated by or based on a local oscillator (LO) clock signal $F_{LO}$ generated by the clock source 150. As an example, the frequency of the LO clock signal $F_{LO}$ (e.g., the sampling rate at which the RF DAC 130 generates the RF signal $V_{RF}$) may be eight (8) GHz. The RF front end 160 is configured to process the RF signal $V_{RF}$ (e.g., power amplify, spectrum mask filter, impedance match, etc.) to generate a transmit RF signal $V_{TXRF}$ for wireless radiation/transmission to one or more remote devices via the at least one antenna 170.

As previously discussed, although the use of the RF DAC approach used by the transmitter 100 to directly synthesize the RF signal $V_{RF}$ for transmission is generally more power efficient compared to other analog approaches, the power consumed by the continued toggling of the oversampling and LO clock signals $F_{OSR}$ and $F_{LO}$ may still be significant.

Accordingly, to reduce the power consumed by the clock signals $F_{OSR}$ and $F_{LO}$, the transmitter 100 further includes an idle data detector 140. The idle data detector 140 is configured to detect an idling of the data (or some other pattern) in the phy data signal $D_{TX}$ (e.g., a stream of idle data or logic zeros (0s) in ternary chips (e.g., +1, 0, −1)) that may result in the RF signal $V_{RF}$ not being generated by the RF DAC 130 (e.g., generated as a substantially constant voltage (e.g., zero (0) Volts (V))) or having a particular characteristic for a set of unit intervals (UIs) or UWB pulse intervals, respectively). In response to detecting a stream of idle data in the phy data signal $D_{TX}$, the idle data detector 140 asserts a disable signal $\overline{en}$ (e.g., or deasserts an enable signal en, which is generally a control signal). In response to the asserted disable signal $\overline{en}$, the clock source 150 ceases generating the oversampling clock signal $F_{OSR}$ and/or the LO clock signal $F_{LO}$. Thus, the transmitter 100 conserves power when there is an absence of data to be transmitted. The following describes example more detailed implementations of the aforementioned power saving technique.

Figure 1B:
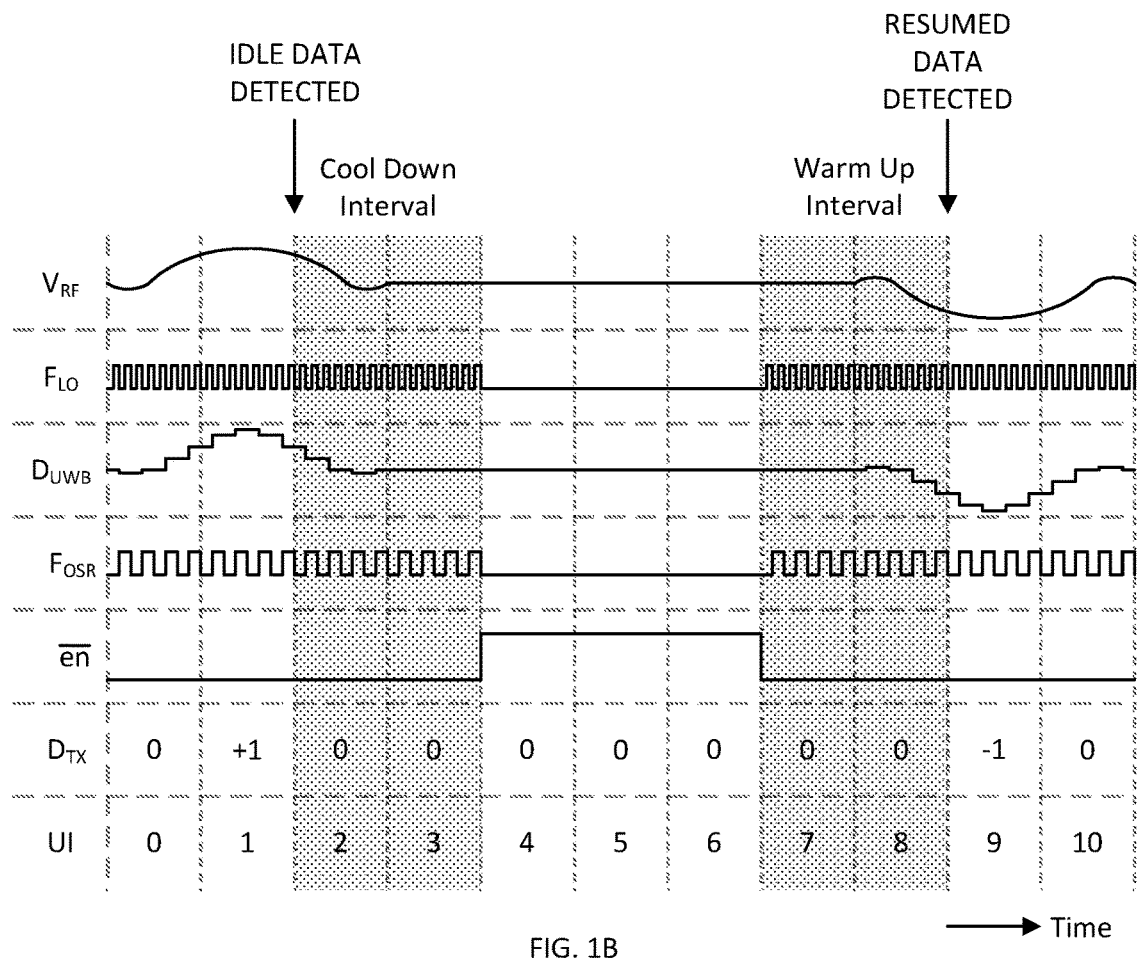
FIG. 1B illustrates a timing diagram of example signals associated with an operation of the transmitter of FIG. 1A in accordance with another aspect of the disclosure.

FIG. 1B illustrates a timing diagram of example signals associated with an operation of the transmitter 100 in accordance with another aspect of the disclosure. The horizontal axis of the timing diagram represents time. The vertical axis, from top to bottom, represents the voltage/state/value of the RF signal $V_{RF}$, the LO clock signal $F_{LO}$, the UWB signal $D_{UWB}$, the oversampling clock signal $F_{OSR}$, the disable signal $\overline{en}$, the phy data signal $D_{TX}$, and the UI index. As mentioned, the phy data signal $D_{TX}$ may be ternary, meaning that it has three logic values: +1, 0, and −1.

During UIs 0-2, the phy data signal $D_{TX}$ includes data with logic values 0, +1, and 0, respectively. The "+1" value corresponds to a positive UWB pulse, the "−1", as discussed further herein, corresponds to a negative UWB pulse, and the "0" generally corresponds to no UWB signal or idle data; however, if it is in a UI adjacent to UI with a "+1" or "−1" value, the "0" affects the synthesis of the positive or negative UWB pulse, respectively. For example, if two (2) 0s are on either side of a +1, the earlier "0" affects the rising portion of the positive UWB pulse, and the later "0" affects the falling portion of the positive UWB pulse. Similarly, if two (2) 0s are on either side of a −1, the earlier "0" affects the falling portion of the negative UWB pulse, and the later "0" affects the rising portion of the negative UWB pulse.

As the phy data signal $D_{TX}$ includes data in UIs 0-2 for generating a positive UWB pulse, the idle data detector 140 generates a deasserted disable signal $\overline{en}$ (e.g., a logic zero (0)) as indicated in the timing diagram. Based on the deasserted disable signal $\overline{en}$, the clock source 150 generates the clock signals $F_{OSR}$ and $F_{LO}$, as indicated in the timing diagram. In response to the oversampling clock signal $F_{OSR}$, the UWB pulse generator 120 generates the UWB signal $D_{UWB}$ with a positive pulse based on the logic values 0, +1, and 0 during UIs 0-2 as indicated in the timing diagram, respectively. Additionally, in response to the LO clock signal $F_{LO}$, the RF DAC 130 generates the RF signal $V_{RF}$ based on the UWB signal $D_{UWB}$ generated during UIs 0-2 as indicated in the timing diagram.

The idle data detector 140 may receive the phy data signal $D_{TX}$ in advance of the UWB pulse generator 120 for determining the state of the disabled signal $\overline{en}$ in advance of its application. Accordingly, in this example, the idle data detector 140 may have detected a stream of idle data between UIs 2-8 (e.g., seven (7) consecutive logic zeros (0s)). As denoted in the left grey region pertaining to UIs 2-3, the idle data detector 140 may wait a cool down time interval (e.g., one or more UIs, such as two (2) UIs in this example) after the end of the data stream at UI=1 to assert the disable signal $\overline{en}$ (e.g., a logic one (1)). This ensures that the clock source 150 is not disabled prematurely, which may impact the accurate generation of the RF signal $V_{RF}$. The cool down interval may be programmable and may be set to one or more UIs. Accordingly, during the cool down interval, the clock source 150 continues to generate the clock signals $F_{OSR}$ and $F_{LO}$, and the UWB signal $D_{UWB}$ and RF signal $V_{RF}$ eventually asymptotes to 0V.

The idle data detector 140 may maintain the disable signal $\overline{en}$ asserted for the duration of the idle data stream minus a warm up interval (e.g., for a duration corresponding to UIs 4-6), as indicated in the timing diagram. Accordingly, while the disable signal $\overline{en}$ is asserted, the clock source 150 ceases to generate the clock signals $F_{OSR}$ and $F_{LO}$, and the UWB signal $D_{UWB}$ and RF signal $V_{RF}$ continue to be at 0V. Thus, the transmitter 100 saves clock signal power during UIs 4-6, in this example.

The idle data detector 140 deasserts the disable signal $\overline{en}$ at a warm up time interval prior to a beginning of a resumed data stream, as denoted in the right grey region pertaining to UIs 7-8, as indicated in the timing diagram. Similarly, the warm up time interval allows the clock signals $F_{OSR}$ and $F_{LO}$ to settle for proper generation of the UWB signal $D_{UWB}$ and the RF signal $V_{RF}$, respectively. As the disable signal $\overline{en}$ is deasserted during the warm up interval, the clock source 150 generates the clock signals $F_{OSR}$ and $F_{LO}$ during such interval. In response to the oversampling clock signal $F_{OSR}$ and the resumption of data in the phy data signal during UIs 8-10, the UWB pulse generator 120 generates the UWB signal $D_{UWB}$ with a negative pulse based on the logic values 0, -1, and 0 during UIs 8-10 as indicated in the timing diagram, respectively. Additionally, in response to the LO clock signal $F_{LO}$, the RF DAC 130 generates the RF signal $V_{RF}$ based on the UWB signal $D_{UWB}$ generated during UIs 8-10 as indicated in the timing diagram.

As mentioned, the cool down interval and warm up interval may each be set to an integer of a UI (e.g., one UI, 2*UI, or more). Further, the cool down interval may be the same or different than the warm up interval.

Figure 2:
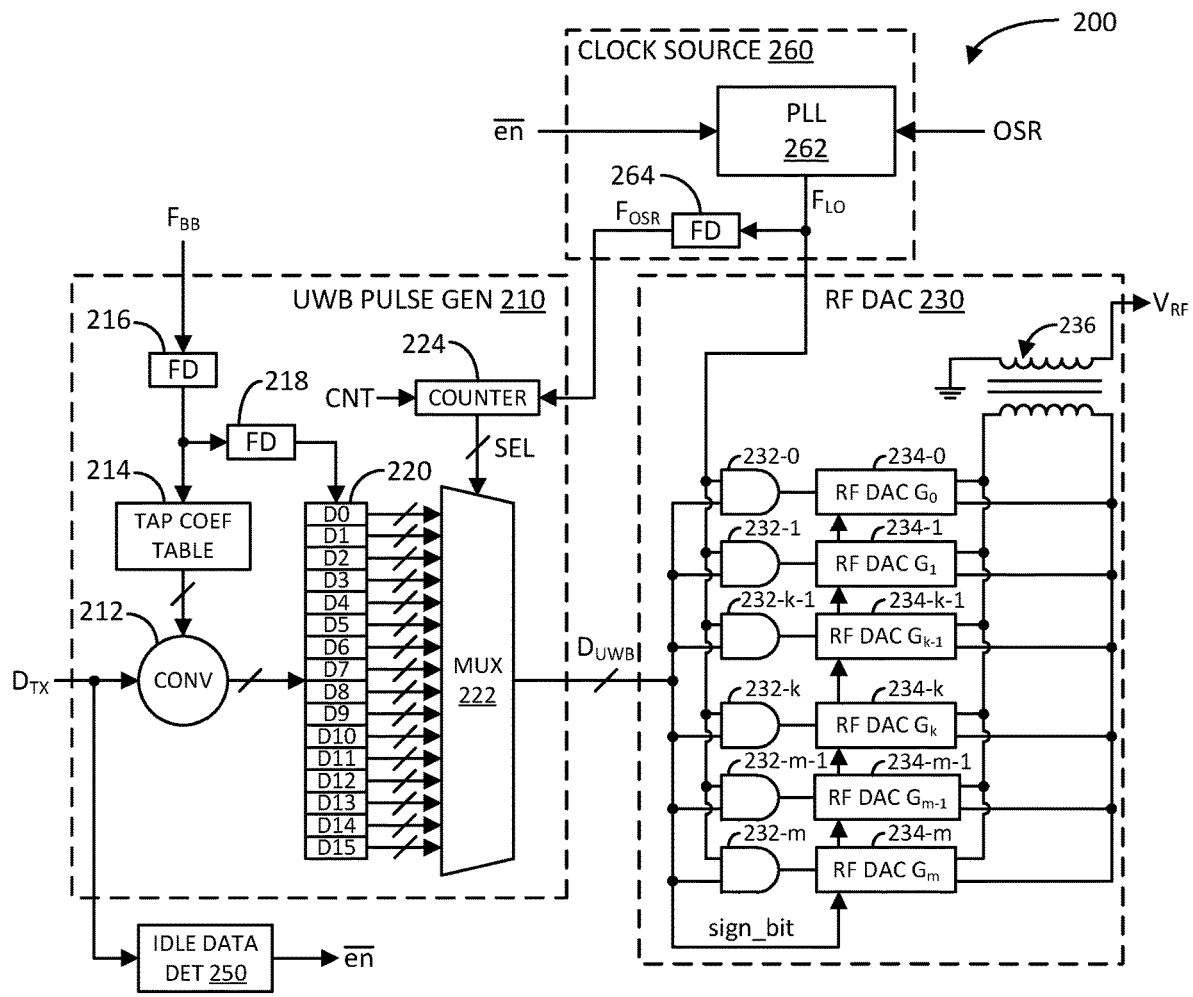
FIG. 2 illustrates a block/schematic diagram of another example transmitter in accordance with another aspect of the disclosure.

FIG. 2 illustrates a block diagram of another example transmitter 200 in accordance with another aspect of the disclosure. The transmitter 200 may be an example more detailed implementation of a portion (e.g., UWB pulse generator 120, RF DAC 130, idle data detector 240, and clock source 150) of the transmitter 100. In particular, the transmitter 200 includes a UWB pulse generator 210, an RF DAC 230, an idle data detector 250, and a clock source 260.

The UWB pulse generator 210 includes a convolution component 212, a pulse tap coefficient table 214, first and second frequency dividers (FDs) 216 and 218, a first-in-first-out (FIFO) memory 220, and a data serializer including multiplexer 222 and counter 224. The convolution component 212 is configured to convolve a transmit phy data signal $D_{TX}$ with pulse tap coefficients to generate samples for a UWB signal $D_{UWB}$ at a rate dictated by the frequency of the baseband clock signal $F_{BB}$ divided by the divider ratio of the frequency divider 216, which should be substantially the data rate of the phy data signal $D_{TX}$. As an example, if the data rate of the phy data signal $D_{TX}$ is 500 Mbps, the frequency of the baseband clock signal $F_{BB}$ may be set to one (1) GHz, and the divider ratio of the frequency divider 216 may be set to two (2). Further, in accordance with this example, the samples of the UWB signal $D_{UWB}$ may have m+1 bit width plus a sign bits.

The samples of the UWB signal $D_{UWB}$ is provided to the FIFO memory 220, which in one non-limiting example may have a size of 16 memory locations D0 to D15 to store two (2) UIs (or other) of pulse samples. The samples of the UWB signal $D_{UWB}$ stored in the FIFO memory 220 are clocked out in parallel to the serializer multiplexer 222 at a rate dictated by the frequency of the baseband clock signal $F_{BB}$ divided by the cumulative divider ratio of the frequency dividers 216 and 218. The divider ratio of the frequency divider 218 should be set based on the UI size of the FIFO memory 220, which in this example is two (2). For example, if the data rate of the phy data signal $D_{TX}$ is 500 Mbps, the frequency of the baseband clock signal $F_{BB}$ may be set to one (1) GHz, the divider ratio of the frequency divider 216 may be set to two (2) to coincide with the data rate of the phy data signal $D_{TX}$, and the divider ratio of the frequency divider 218 may be set to two (2) to coincide with clocking out 2*UIs of pulse samples at a time.

The multiplexer 222 is configured to serialize the parallel samples of the UWB signal $D_{UWB}$ at a rate based on the frequency of the oversampling clock signal $F_{OSR}$ received from the clock source 260. The number of parallel samples received from the FIFO memory 220 depends on the oversampling ratio, which is the number of samples of the UWB signal in a UI. The oversampling ratio may be fractional and integer, and may be programmable. For example, the oversampling ratio may be programmed to be 6.5, 7, 7.5, and 8. As, in this example, the size of the FIFO memory 220 is 2*UI, the FIFO memory 220 holds 13, 14, 15, and 16 for oversampling ratios 6.5, 7, 7.5, and 8, respectively. The counter 224 generates the mux selection signal (SEL) based on the oversampling clock signal $F_{OSR}$ and the max count (CNT), which may be programmed to be twice the programmed oversampling ratio of 13, 14, 15, or 16.

The clock source 260 may include a phase lock loop (PLL) 262, which may be disabled/enabled based on a disable signal $\overline{en}$ generated by the idle data detector 250, as previously discussed. The PLL 262 is configured to generate the LO clock signal $F_{LO}$ whose frequency may be based on the programmed oversampling ratio (e.g., 6.5, 7, 7.5, and 8). For example, the frequency of the LO clock signal $F_{LO}$ may be set to 6.5, 7, 7.5, and 8 GHz based on programmed oversampling ratios 6.5, 7, 7.5, and 8, respectively. The clock source 260 may further include a frequency divider (FD) 264 configured to frequency divide the LO clock signal $F_{LO}$ by a divider ratio to generate the oversampling clock signal $F_{OSR}$. For example, if the divider ratio of the frequency divider 264 is set to two (2), the frequency of the oversampling clock signal FOR may be set to 3.25, 3.5, 3.75, and 4 GHz based on programmed oversampling ratios 6.5, 7, 7.5, and 8, respectively. The multiplexer 222 outputs the serialized UWB signal $D_{UWB}$, which, as discussed, may have a m+1 bit width including a sign bit.

The RF DAC 230 includes a set of gating devices (e.g., AND gates) 232-0 to 232-m including respective first inputs configured to receive the m+1 significant bits of the serialized UWB signal $D_{UWB}$, respectively. The set of gating devices 232-0 to 232-m include respective second inputs configured to receive the LO clock signal $F_{LO}$. Accordingly, the LO clock signal $F_{LO}$ controls the rate at which the set of gating devices 232-0 to 232-m output the serialized UWB signal $D_{UWB}$. The RF DAC 230 further includes a set of weighted RF DACs 234-0 to 234-m configured to generate a set of weighted portions $G_0$ to $G_m$ of the RF signal $V_{RF}$ based on the significant bits of the serialized UWB signal $D_{UWB}$ outputted by the set of gating devices 232-0 to 232-m, respectively. The set of gating devices 232-0 to 232-m and the set of weighted RF DACs 234-0 to 234-$m$ process the least significant bit (LSB) to the most significant bit (MSB) of the serialized UWB signal $D_{UWB}$, respectively. The weighted portions $G_0$ to $G_m$ may all be the same, may be binary-weighted, or weighted in other manners.

Each of the set of weighted RF DACs 234-0 to 234-$m$ further includes an input configured to receive the sign bit of the serialized UWB signal $D_{UWB}$, which controls whether the set of weighted RF DACs 234-0 to 234-$m$ generate a positive voltage for a positive UWB pulse or a negative voltage for a negative UWB pulse. The differential outputs of the set of weighted RF DACs 234-0 to 234-$m$ are coupled to both ends of a primary winding of a transformer (balun) 236, which serves as a signal combiner or summer. The transformer 236 includes a secondary winding with a first end to output the RF signal $V_{RF}$ and a second end coupled to ground. Thus, the transformer 236 combines or sums the weighted portions of the RF signal $V_{RF}$ generated by the set of weighted RF DACs 234-0 to 234-$m$ at the primary winding to produce the RF signal $V_{RF}$ at the secondary winding via transformer magnetic coupling.

With regard to the power saving technique previously discussed, the idle data detector 250 is configured to detect a stream of idle data (e.g., consecutive logic zeros (0s)), and is configured to generate an asserted disable signal $\overline{en}$ a cool down interval after an end of a preceding stream of data and a warm up interval prior to a start of a following stream of data. In response to the asserted disable signal $\overline{en}$, the PLL 262 of the clock source 260 ceases to generate the LO clock signal $F_{LO}$. As the LO clock signal $F_{LO}$ is no longer generated, the frequency divider 264 has no input clock signal to divide. Accordingly, the frequency divider 264 also ceases to generate the oversampling clock signal $F_{OSR}$. Thus, the transmitter 200 saves power.

Figure 3A:
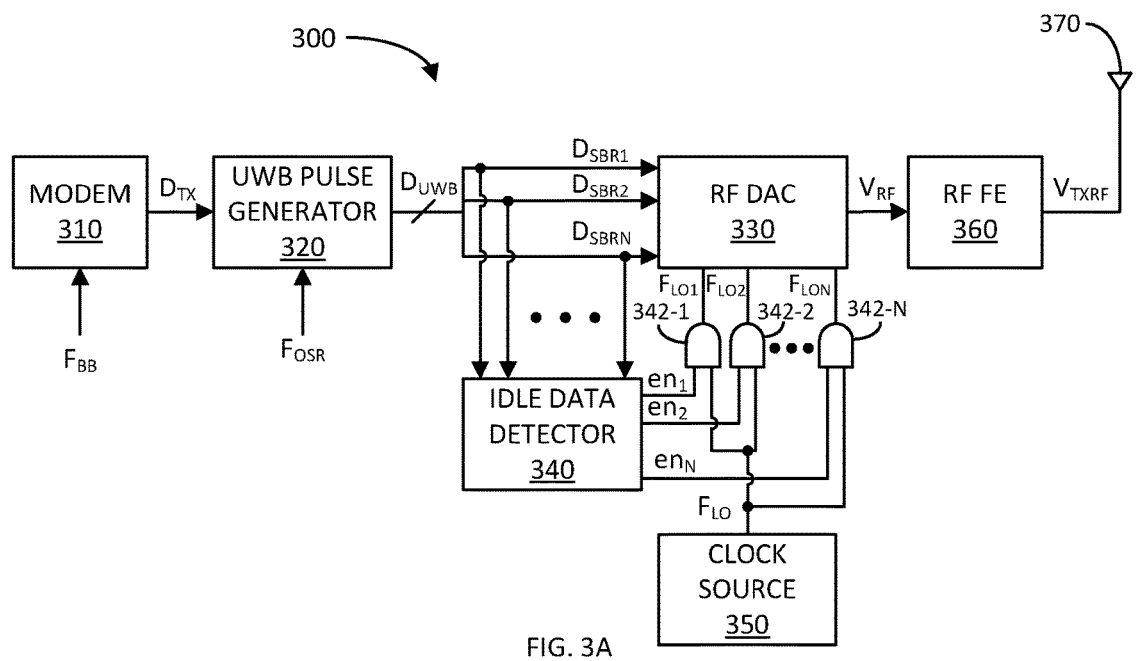
FIG. 3A illustrates a block diagram of another example transmitter in accordance with another aspect of the disclosure.

FIG. 3A illustrates a block diagram of another example transmitter 300 in accordance with another aspect of the disclosure. As discussed in more detail further herein, the transmitter 300 performs a similar power saving technique as transmitters 100 and 200 previously discussed. However, the transmitter 300 performs the power saving technique on a per significant bit basis of a UWB signal $D_{UWB}$ generated by a UWB pulse generator.

With reference to the transmitter 200 shown in FIG. 2, the UWB pulse generator 210 generates a UWB signal $D_{UWB}$ that has m+1 significant bits and a sign bit. The m+1 significant bits may be sub-divided into three groups: (1) the most LSBs; (2) the MSB minus one (MSB-1) bit; and (3) the MSB bit (but may be grouped in many different arrangements). The transmitter 300 includes an idle data detector that detects idle data separately in the three (3) groups of significant bits.

For example, if the idle data detector detects a stream of idle data in the MSB bit, the idle data detector disables the LO clock signal $F_{LO}$ for the corresponding gating device and RF DAC (e.g., AND gate 232-$m$ and RF DAC 234-$m$). Similarly, if the idle data detector detects a stream of idle data in the MSB-1 bit, the idle data detector disables the LO clock signal $F_{LO}$ for the corresponding gating device and RF DAC (e.g., AND gate 232-$m$-1 and RF DAC 234-$m$-1). And, if the idle data detector detects a stream of idle data in all of the most LSBs, the idle data detector disables the LO clock signal $F_{LO}$ for the corresponding gating devices and RF DACs (e.g., AND gates 232-0 to 232-$k$ and RF DACs 234-0 to 232-$k$).

With reference again to FIG. 3A, the transmitter 300 includes a modem 310, a UWB pulse generator 320, an RF DAC 330, a clock source 350, an RF front end (RF FE) 360, and at least one antenna 370. The modem 310 is configured to generate a transmit phy data signal $D_{TX}$ based on a baseband (BB) clock signal $F_{BB}$ (e.g., at a rate based on the frequency of the baseband clock signal $F_{BB}$). The UWB pulse generator 320 is configured to generate a UWB signal $D_{UWB}$ including UWB pulses based on the phy data signal $D_{TX}$ and at an oversampling rate (OSR) based on a clock signal $F_{OSR}$ generated by the clock source 350 (or another clock source). The UWB signal $D_{UWB}$ may have a certain bit width, which may be sub-divided into a set of significant bit groups $D_{SRB1}$, $D_{SRB2}$, to $D_{SRBN}$, where each significant bit group may include one or more significant bits.

The RF DAC 330 is configured to generate an RF signal $V_{RF}$ based on the UWB signal $D_{UWB}$ at a sampling rate based on an LO clock signal $F_{LO}$ generated by the clock source 350. More specifically, the RF DAC 330 is configured to generate portions of the RF signal $V_{RF}$ based on the set of significant bit groups $D_{SRB1}$, $D_{SRB2}$, to $D_{SRBN}$ of the UWB signal $D_{UWB}$ and a set of selected (ungated) LO clock signals $F_{LO1}$, $F_{LO2}$, to $F_{LON}$ based on the LO clock signal $F_{LO}$ generated by the clock source 350, respectively. The RF DAC 330 further combines or sums the RF signal portions to generate the RF signal $V_{RF}$. The RF front end 360 is configured to process the RF signal $V_{RF}$ (e.g., power amplify, spectrum mask filter, impedance match, etc.) to generate a transmit RF signal $V_{TXRF}$ for wireless radiation/transmission to one or more remote devices via the at least one antenna 370.

To reduce the power consumed by the LO clock signal $F_{LO}$, the transmitter 300 further includes an idle data detector 340 and a set of clock gating devices, such as AND gates 342-1, 342-2 to 342-N. The idle data detector 340 is configured to detect a stream of idle data in each of the set of significant bit groups $D_{SRB1}$, $D_{SRB2}$, to $D_{SRBN}$ of the UWB signal $D_{UWB}$. The idle data detector 340 is further configured to generate a set of enable signals $en_1$, $en_2$, to $en_N$ based on the idle data detection in the set of significant bit groups $D_{SRB1}$, $D_{SRB2}$, to $D_{SRBN}$ of the UWB signal $D_{UWB}$, respectively.

For example, if the idle data detector 340 detects a stream of idle data in the set of significant bit groups $D_{SRB1}$, $D_{SRB2}$, to $D_{SRBN}$, the idle detector 340 deasserts (e.g., sets to a logic zero (0)) the corresponding enable signals $en_1$, $en_2$, to $en_N$. Otherwise, the idle detector 340 asserts (e.g., sets to a logic one (1)) the corresponding enable signals $en_1$, $en_2$, to $en_N$. As the idling of data in any of the two or more bit groups $D_{SRB1}$, $D_{SRB2}$, to $D_{SRBN}$ of the UWB signal $D_{UWB}$ does not contribute to the generation of the RF signal $V_{RF}$, the corresponding deasserted enable signals $en_1$, $en_2$, to $en_N$ control the corresponding AND gates 342-1, 342-2 to 342-N to gate the LO clock signal $F_{LO}$ so that the corresponding LO clock signals $F_{LO1}$, $F_{LO2}$ to $F_{LON}$ are gated, or not selected or generated so as not to consume toggling power.

Figure 3B:
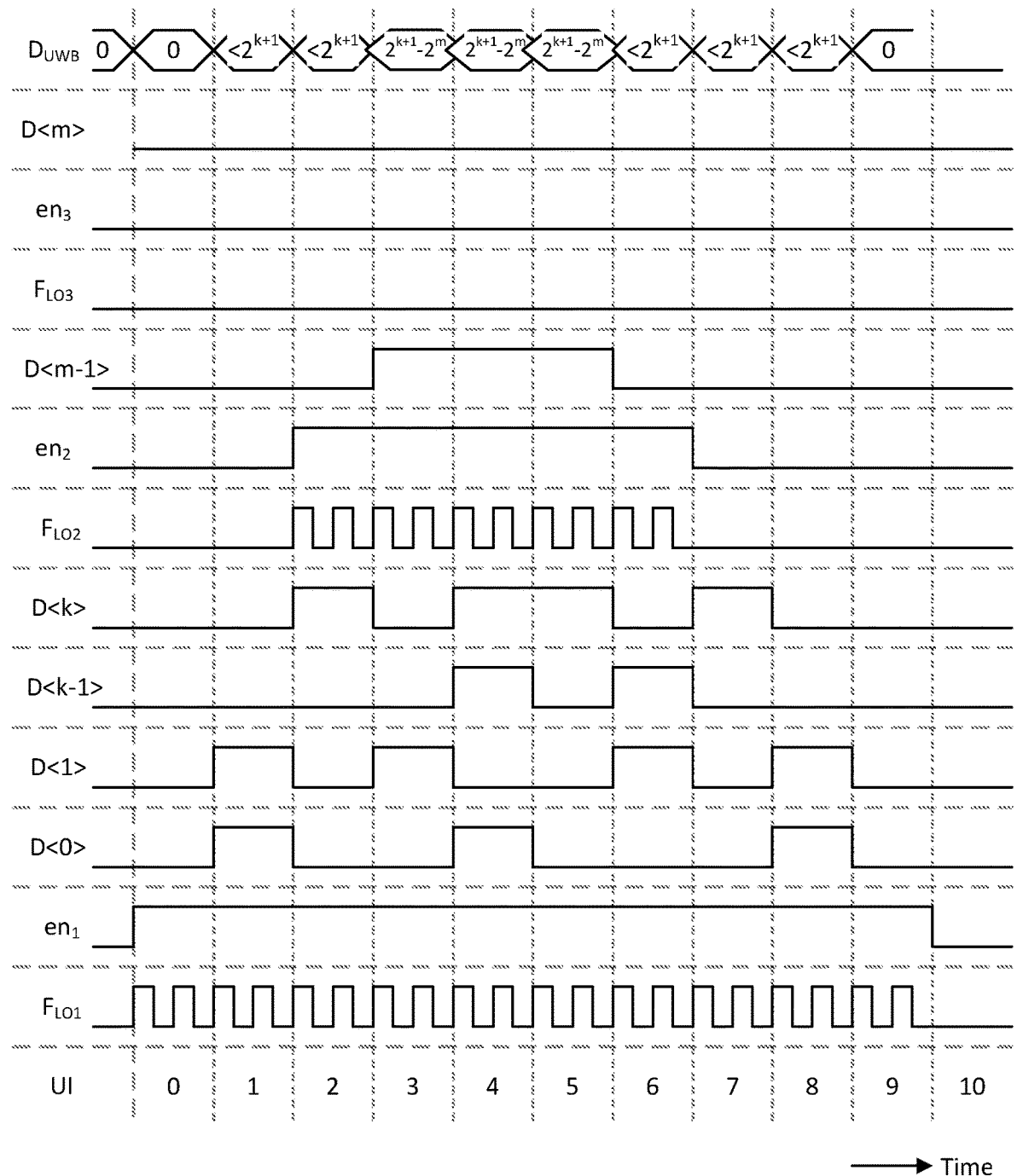
FIG. 3B illustrates a timing diagram of example signals associated with an operation of the transmitter of FIG. 3A in accordance with another aspect of the disclosure.

FIG. 3B illustrates a timing diagram of example signals associated with an operation of the transmitter 300 in accordance with another aspect of the disclosure. In this example, the set of significant bit groups $D_{SRB1}$, $D_{SRB2}$, to $D_{SRBN}$ of an m+1 bit UWB signal $D_{UWB}$ include three (3) groups: (1) the most LSBs D<k:0>; (2) the MSB-1 bit D<m-1>; and (3) the MSB D<m>. The horizontal axis of the timing diagram represents time. The vertical axis, from top to bottom, represents the value/state of the UWB signal $D_{UWB}$, the MSB D<m> of the UWB signal $D_{UWB}$, the enable signal $en_3$ corresponding to the MSB D<m>, the LO clock signal $F_{LO3}$ corresponding to the MSB D<m>, the MSB-1 D<m-1> of the UWB signal $D_{UWB}$, the enable signal $en_2$ corresponding to the MSB-1 D<m-1>, the LO clock signal $F_{LO2}$ corresponding to the MSB-1 D<m-1>, the most LSBs D<k>, D<k-1> . . . . D<1>, and D<0>, the enable signal $en_1$ corresponding to the most LSBs D<k>, D<k-1> . . . . D<1>, and D<0>, the LO clock signal $F_{LO1}$ corresponding to the most LSBs D<k>, D<k-1> . . . . D<1>, and D<0>, and the UI index.

Prior to and during UI=0, the UWB signal $D_{UWB}$ has a value of zero (0). Then, during UI=1, the UWB signal $D_{UWB}$ has a positive value of $<2^{k+1}$. Thus, according to this example, prior to UI=0, the idle data detector 340 detected idle data in the three groups of significant bits: D<k:0>, D<m-1>, and D<m> of the UWB signal $D_{UWB}$; and thus, generated corresponding deasserted enable signals $en_1$, $en_2$, and $en_3$. Based on the deasserted enable signals $en_1$, $en_2$, and $en_3$, the corresponding AND gates 342-1, 342-2, and 342-3 gate the LO clock signal $F_{LO}$ so that the corresponding LO clock signals $F_{LO1}$, $F_{LO2}$, and $F_{LO3}$ are not selected or generated to conserve LO clock signal power.

As the UWB signal $D_{UWB}$ has a positive value of $<2^{k+1}$ during UI=1, the idle data detector 340 asserts the enable signal $en_1$, corresponding to the significant bit group D<k:0> responsible for $D_{UWB}=<2^{k+1}$. The idle data detector 340 asserts the enable signal $en_1$ a warm up interval of, for example, one (1) UI prior to the beginning of the data stream at UI=1, as indicated in the timing diagram. Thus, the corresponding LO clock signal $F_{LO1}$ is selected or generated starting at UI=0 and continues during UI=1. It shall be understood that the warm up interval may be more than one (1) UI, and could also be programmable. The other significant bit groups D<m-1> and D<m> are neither responsible for generating $D_{UWB}=<2^{k+1}$ in UI=1 nor $D_{UWB}=<2^{k+1}$ in UI=2; and thus, the idle data detector 340 continues to detect idle data in such groups, and maintains the corresponding enable signals $en_2$ and $en_3$ deasserted during UI=0 and UI=1 so as not to select or generate the corresponding LO clock signals $F_{LO2}$ and $F_{LO3}$ during such intervals for power saving purposes.

During UI=2, the UWB signal $D_{UWB}$ has a positive value of $<2^{k+1}$; and thus, the only significant bit group contributing to such value is D<k:0>. Thus, the idle data detector 340 continues to assert the corresponding enable signal $en_1$ during UI=2 so that the LO clock signal $F_{LO1}$ is selected or generated. During UI=3, the UWB signal $D_{UWB}$ has a value between $2^{k+1}$ and $2^m$; and thus, both significant bit groups D<k:0> and D<m-1> contribute to $D_{UWB}=2^{k+1}$ to $2^m$. Accordingly, the idle data detector 340 asserts the enable signal $en_2$ corresponding to the significant bit group D<m-1> a warm up interval of one UI prior to the start of the stream of data at UI=3 (e.g., during UI=2); and thus, the corresponding LO clock signal $F_{LO2}$ is selected or generated during such interval. As the other significant bit group D<m> does not contribute to $D_{UWB}=2^{k+1}=2^m$, the idle data detector 340 continues to detect idle data in such group, and maintains the corresponding enable signal $en_3$ deasserted during UI=3 so as not to select or generate the corresponding LO clock signal $F_{LO3}$ during such interval for power saving purposes.

The idle data detector 340 continues to operate in a similar manner for UIs=4-10 as indicated in the timing diagram. Note that the value of the UWB signal $D_{UWB}$ does not exceed $2^{m+1}$ in this example; and thus, the idle data detector 340 continues to detect idle data in the significant bit group D<m> for UIs=4-10 so that the corresponding LO clock signal $F_{LO3}$ is not selected or generated for power saving purposes. Also note that the idle data detector 340 also implements a cool down interval of, for example, one (1) UI after and end of the stream of data in significant bit group D<m-1>, as indicated in UI=6 where the idle data detector 340 maintains the enable signal $en_2$ asserted so that the LO signal $F_{LO2}$ continues to be selected or generated even though the corresponding significant bit group D<m-1> does not contribute to $D_{UWB}=<2^{k+1}$ during UI=6. Similarly, it shall be understood that the cool down interval may be more than one (1) UI, may have a different duration as the warm up interval, and could also be programmable. Also note that a stream of data in one or more significant bit group (e.g., D<k:0> and D<m-1>) and a stream of idle data in another significant bit group (e.g., D<m>) may be concurrent (e.g., during UIs 3-6); thus, two of the LO clock signals are active, while another clock signal is inactive for power saving purposes.

Figure 4:
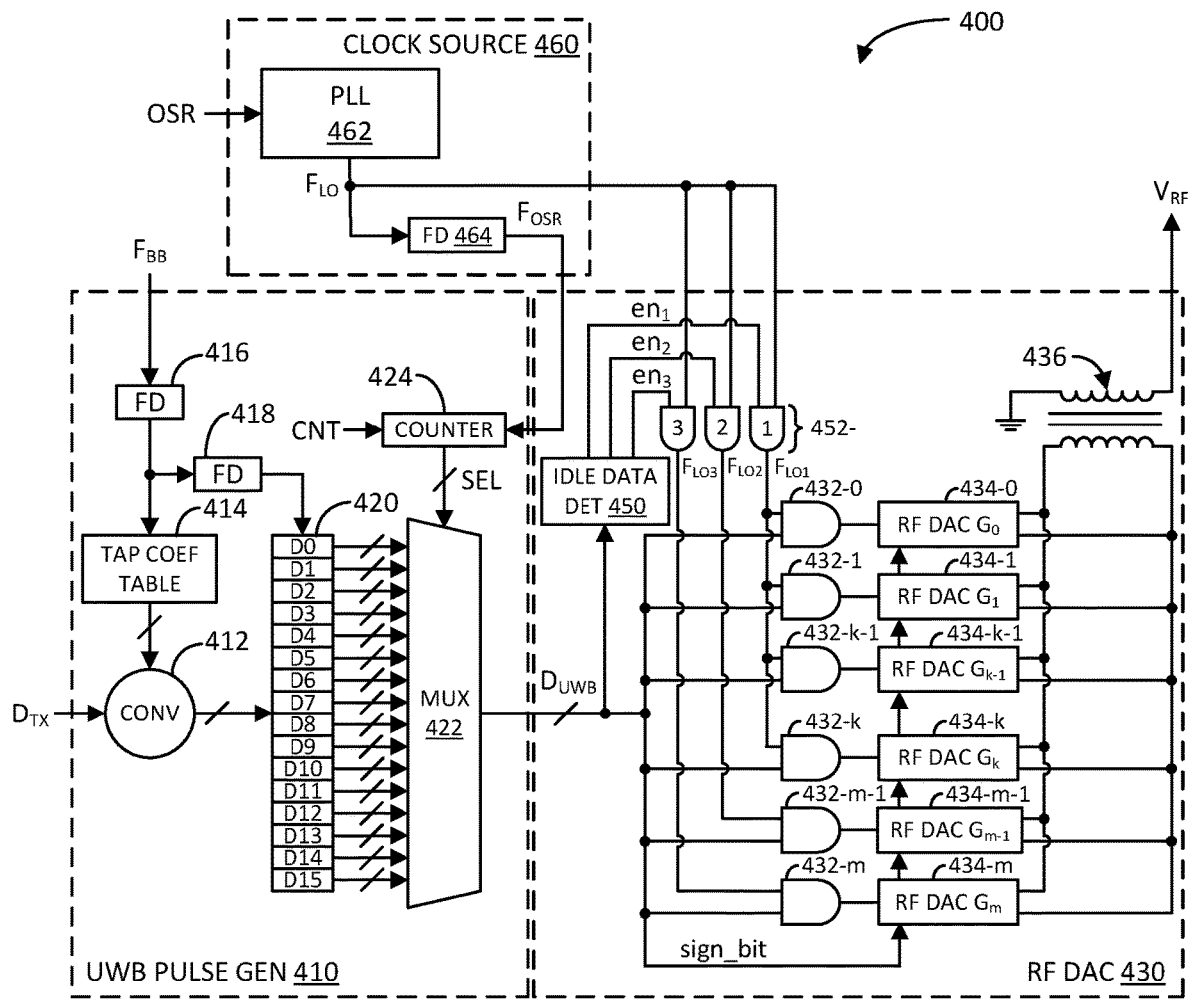
FIG. 4 illustrates a block/schematic diagram of another example transmitter in accordance with another aspect of the disclosure.

FIG. 4 illustrates a block diagram of another example transmitter 400 in accordance with another aspect of the disclosure. The transmitter 400 may be an example more detailed implementation of a portion (e.g., UWB pulse generator 320, RF DAC 330, idle data detector 340, and clock source 350) of the transmitter 300.

Further, the transmitter 400 is based on the transmitter 200, and includes many of the same/similar elements as indicated by the same reference numbers but with a different most significant digit of "4" in transmitter 400 instead of a "2" as in transmitter 200. Accordingly, the transmitter 400 includes: a UWB pulse generator 410 including a convolution component 412, a pulse tap coefficient table 414, a pair of frequency dividers (FDs) 416 and 418, a FIFO memory 420, and a data serializer including multiplexer 422 and counter 424; an RF DAC 430 including a set of gating devices (e.g., AND gates) 432-0 to 432-m, a set of RF DACs 434-0 to 434-m, and a transformer (balun) 436; and a clock source 460 including a PLL 462 and a frequency divider (FD) 464. These elements have been described in detail with reference to the corresponding elements in transmitter 200.

As previously mentioned, the transmitter 400 may be an example more detailed implementation of a portion of the transmitter 300, which implements idle data detection for power conservation purposes on a per significant bit group basis. In this regard, the transmitter 400 includes an idle data detector 450 including an input coupled to the output of the multiplexer 422 to receive the UWB signal $D_{UWB}$. The idle data detector 450 is configured to generate a set of enable signals $en_1$, $en_2$, and $en_3$ based on detecting idle data in significant bit groups D<k:0>, D<m-1>, and D<m> of the UWB signal $D_{UWB}$, respectively.

As previously discussed, if the idle data detector 450 detects a stream of idle data in any of the significant bit groups D<k:0>, D<m-1>, and D<m>, the idle data detector 450 deasserts the corresponding enable signals $en_1$, $en_2$, and $en_3$; or conversely, if the idle data detector 450 does not detect a stream of idle data in any of the significant bit groups D<k:0>, D<m-1>, and D<m>, the idle data detector 450 asserts the corresponding enable signals $en_1$, $en_2$, and $en_3$. Also, as previously discussed, the idle data detector 450 may institute warm up and cool down intervals, as previously discussed. For example, the idle data detector 450 may assert any of the significant bit groups D<k:0>, D<m-1>, and D<m> that contribute to value of the UWB signal $D_{UWB}$ during a particular UI a warm up interval prior to that UI. Similarly, the idle data detector 450 may deassert any of the significant bit groups D<k:0>, D<m-1>, and D<m> that contribute to value of the UWB signal $D_{UWB}$ during a particular UI a cool down interval after that UI.

The transmitter 400 further includes a set of gating devices (e.g., AND gates) 452-1, 452-2, and 453-3 including respective first inputs coupled to outputs of the idle data detector 450 to receive the set of enable signals $en_1$, $en_2$, and $en_3$, respectively. The set of gating devices 452-1, 452-2, and 453-3 include respective second inputs coupled to an output of the clock source 460 to receive the LO clock signal $F_{LO}$. The set of gating devices 452-1, 452-2, and 453-3 are configured to gate/pass the LO clock signal $F_{LO}$ to unselect/select a set of LO clock signals $F_{LO1}$, $F_{LO2}$, and $F_{LO3}$, respectively. The set of gating devices 452-1, 452-2, and 453-3 include outputs, at which the LO clock signals $F_{LO1}$, $F_{LO2}$, and $F_{LO3}$ may be generated, coupled to respective first inputs of gating devices 432-0 to 432-$k$ (corresponding to the first significant bit group D<k:0>), gating device 432-$m$-1 (corresponding to the second significant bit group D<m-1>), and gating device 432-$m$ (corresponding to the third significant bit group D<m>).

The power saving techniques operates as follows: if the idle data detector 450 detects idle data in only significant bit group D<m> (e.g., $D_{UWB} < 2^m$), the idle data detector 450 deasserts the enable signal $en_3$. This causes the gating device 452-3 to gate LO clock signal $F_{LO}$ to prevent the LO clock signal $F_{LO3}$ from being generated. And thus, no LO clock signal power is consumed in driving the corresponding RF DAC 434-$m$. In this example, the idle data detector 450 asserts the enable signals $en_1$ and $en_2$ as it has not detected idle data in significant bit groups D<3:0> and D<4>, respectively. Accordingly, the gating devices 452-1 and 452-2 pass the LO clock signal $F_{LO}$ to generate LO clock signals $F_{LO1}$ and $F_{LO2}$, respectively. Thus, LO clock signal power is consumed in driving RF DACs 434-0 to 434-$m$-1 as the active significant bit groups D<k:0> and D<m-1> that contribute to the generation of the RF signal $V_{RF}$.

Similarly, if the idle data detector 450 detects idle data in only significant bit groups D<m-1> and D<m> (e.g., $D_{UWB} < 2^{k+1}$), the idle data detector 450 deasserts the enable signals $en_2$ and $en_3$. This causes the gating devices 452-2 and 452-3 to gate LO clock signal $F_{LO}$ to prevent the LO clock signals $F_{LO2}$ and $F_{LO3}$ from being generated. Thus, no LO clock signal power is consumed in driving the corresponding RF DACs 434-$m$-1 and 434-$m$. Further, in accordance with this example, the idle data detector 450 asserts the enable signal $en_1$ as it has not detected idle data in significant bit group D<k:0>. Accordingly, the gating device 452-1 passes the LO clock signal $F_{LO}$ to generate LO clock signal $F_{LO1}$. Thus, LO clock signal power is consumed in driving RF DACs 434-0 to 434-$k$ as the active significant bit group D<k:0> that contributes to the generation of the RF signal $V_{RF}$.

In a like manner, if the idle data detector 450 detects idle data in all significant bit groups D<k:0>, D<m-1>, and D<m> (e.g., $D_{UWB} = 0$), the idle data detector 450 deasserts all the enable signals $en_1$, $en_2$ and $en_3$. This causes all of the gating devices 452-1, 452-2, and 452-3 to gate LO clock signal $F_{LO}$ to prevent all the LO clock signals $F_{LO1}$, $F_{LO2}$ and $F_{LO3}$ from being generated. Thus, no LO clock signal power is consumed in driving any of the RF DACs 434-0 to 434-$m$. This scenario is similar to when the idle data detector 140 or 250 detects idle data in the phy data signal $D_{TX}$ in transmitter 100 or 200, respectively.

Figure 5:
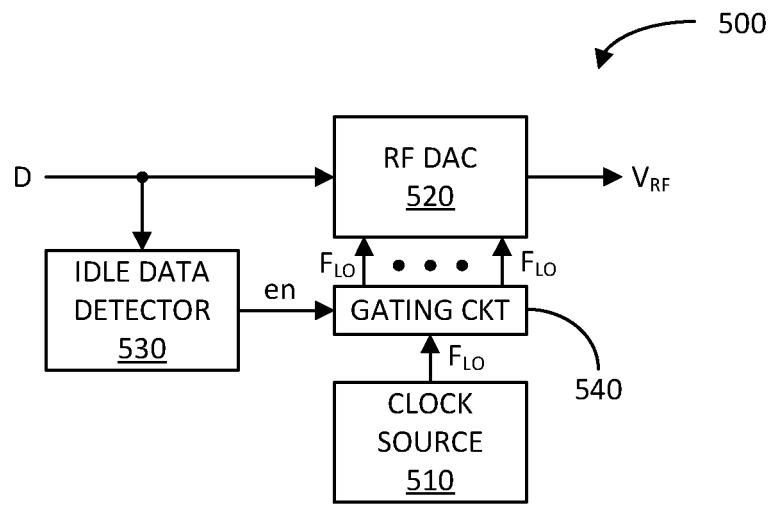
FIG. 5 illustrates a block diagram of another example transmitter in accordance with another aspect of the disclosure.

FIG. 5 illustrates a block diagram of another example transmitter 500 in accordance with another aspect of the disclosure. The transmitter 500 includes a clock source 510 configured to generate a local oscillator (LO) clock signal $F_{LO}$; a radio frequency digital-to-analog converter (RF DAC) 520 configured to generate a radio frequency (RF) signal $V_{RF}$ based on a data signal (D) and the LO clock signal $F_{LO}$; and an idle data detector 530 configured to: detect a stream of idle data in the data signal (D), and disable the providing of the LO clock signal $F_{LO}$ to at least a portion of the RF DAC 520 (e.g., via a deasserted enable signal en (or an asserted disable signal $\overline{en}$) provided to a gating circuit 540) in response to detecting the stream of idle data.

Figure 6:
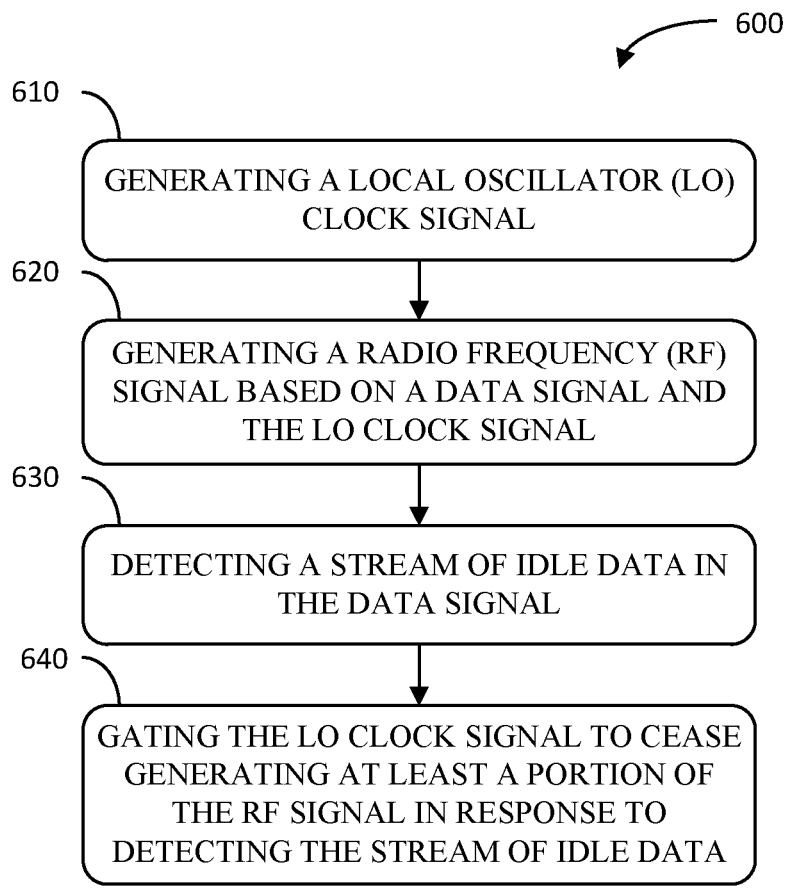
FIG. 6 illustrates a flow diagram of an example method of generating a radio frequency (RF) signal for wireless transmission in accordance with another aspect of the disclosure.

FIG. 6 illustrates a flow diagram of an example method 600 of generating a radio frequency (RF) signal for wireless transmission in accordance with another aspect of the disclosure. The method 600 includes generating a local oscillator (LO) clock signal (block 610). Examples of means for generating a local oscillator (LO) clock signal include any of the clock sources 150, 260, 350, 460, and 510. The method 600 further includes generating a radio frequency (RF) signal based on a data signal and the LO clock signal (block 620). Examples of means for generating a radio frequency (RF) signal based on a data signal and the LO clock signal include any of the RF DACs 130, 230, 330, 430, and 520.

Additionally, the method 600 includes detecting a stream of idle data in the data signal (block 630). Examples of means for detecting a stream of idle data in the data signal include any of the idle data detectors 140, 250, 340, 450, and 530. Further, the method 600 includes gating the LO clock signal to cease generating at least a portion of the RF signal in response to detecting the stream of idle data (block 640). Examples of means for gating the LO clock signal to cease generating at least a portion of the RF signal in response to detecting the stream of idle data include any of the idle data detectors 140, 250, 340, 450, and 530, clock sources 150, 260, and 350, gating devices 452-1 to 452-3, and gating circuit 540.

The following provides an overview of aspects of the present disclosure:

Aspect 1: An apparatus, comprising: a clock source configured to generate a local oscillator (LO) clock signal; a radio frequency digital-to-analog converter (RF DAC) configured to generate a radio frequency (RF) signal based on a data signal and the LO clock signal; and an idle data detector configured to: detect a stream of idle data in the data signal; and disable providing the LO clock signal to at least a portion of the RF DAC in response to detecting the stream of idle data.

Aspect 2: The apparatus of aspect 1, wherein the data signal comprises a transmit physical layer data signal.

Aspect 3: The apparatus of aspect 1 or 2, wherein the stream of idle data follows a stream of data in the data signal, and wherein the idle data detector is configured to disable the providing of the LO clock signal a time interval after an end of the stream of data.

Aspect 4: The apparatus of aspect 3, wherein the time interval is programmable.

Aspect 5: The apparatus of aspect 3 or 4, wherein the time interval is set to one or more unit intervals (UIs) of the data signal.

Aspect 6: The apparatus of any one of aspects 1-5, wherein a stream of data in the data signal follows the stream of idle data, and wherein the idle data detector is configured to enable the providing of the LO clock signal to the at least portion of the RF DAC a time interval prior to a beginning of the stream of data.

Aspect 7: The apparatus of aspect 6, wherein the time interval is programmable.

Aspect 8: The apparatus of aspect 6 or 7, wherein the time interval is set to one or more unit intervals (UIs) of the data signal.

Aspect 9: The apparatus of any one of aspects 1-8, wherein the data signal comprises a transmit physical layer data signal, and further comprising an ultra-wideband (UWB) pulse generator configured to generate a transmit UWB signal based on the transmit physical layer data signal and an oversampling clock signal.

Aspect 10: The apparatus of aspect 9, wherein the idle data detector is further configured to disable providing the oversampling clock signal to the UWB pulse generator in response to detecting the stream of idle data.

Aspect 11: The apparatus of any one of aspects 1-10, wherein the data signal comprises a transmit ultra-wideband (UWB) signal.

Aspect 12: The apparatus of any one of aspects 1-11, wherein the data signal comprises a set of significant bit groups, wherein each of the significant bit groups includes one or more significant bits.

Aspect 13: The apparatus of aspect 12, wherein the RF DAC comprises: a set of RF DACs configured to generate a set of RF signal portions based on the set of significant bit groups, respectively; and a signal combiner configured to combine the set of RF signal portions to generate the RF signal.

Aspect 14: The apparatus of aspect 13, wherein the idle data detector is configured to: detect the stream of idle data in a first subset of one or more of the set of two or more significant bit groups; and disable the providing of the LO clock signal to a first subset of one or more of the set of two or more RF DACs corresponding to the first subset of one or more of the set of two or more significant bit groups.

Aspect 15: The apparatus of aspect 14, wherein the idle data detector is configured to: detect a stream of data in a second subset of one or more of the set of significant bit groups, wherein the stream of data is concurrent with the stream of idle data; and enable providing of the LO clock signal to a second subset of one or more of the set of RF DACs corresponding to the second subset of one or more of the set of significant bit groups.

Aspect 16: A method, comprising: generating a local oscillator (LO) clock signal; generating a radio frequency (RF) signal based on a data signal and the LO clock signal; detecting a stream of idle data in the data signal; and gating the LO clock signal to cease generating at least a portion of the RF signal in response to detecting the stream of idle data.

Aspect 17: The method of aspect 16, wherein the stream of idle data follows a stream of data in the data signal, and wherein gating the LO clock signal begins at a time interval after an end of the stream of data.

Aspect 18: The method of aspect 16 or 17, wherein a stream of data in the data signal follows the stream of idle data, and further comprising ungating the LO clock signal to generate the at least portion of the RF signal a time interval before a beginning of the stream of data.

Aspect 19: The method of any one of aspects 16-18, wherein: the data signal comprises a set of significant bit groups, wherein each of the significant bit groups includes one or more significant bits; and generating the RF signal comprises: generating a set of RF signal portions based on the set of significant bit groups, respectively; and combining the set of RF signal portions to generate the RF signal.

Aspect 20: The method of aspect 19, wherein gating the LO clock signal to cease generating the at least the portion of the RF signal, comprises: detecting the stream of idle data in one or more of the set of significant bit groups; and gating the LO clock signal to cease generating one or more of the set of RF signal portions based on the one or more of the set of significant bit groups in which the stream of idle detected has been detected.

Aspect 21: An apparatus, comprising: a modem configured to generate a physical layer ("phy") data signal; an ultra-wideband (UWB) pulse generator configured to generate a UWB signal based on the phy data signal and a first clock signal; a radio frequency digital-to-analog converter (RF DAC) configured to generate a radio frequency (RF) signal based on the UWB signal and a second clock signal; and a gating circuit configured to gate the second clock signal from being applied to the RF DAC in response to a pattern in the phy data signal.

Aspect 22: The apparatus of aspect 21, wherein the gating circuit is further configured to gate the first clock signal from being applied to the UWB pulse generator in response to the pattern in the phy data signal.

Aspect 23: The apparatus of aspect 21 or 22, further comprising an idle data detector configured to detect the pattern in the phy data signal, wherein the pattern includes a stream of idle data.

Aspect 24: The apparatus of aspect 23, wherein: a stream of data in the phy data signal follows the stream of idle data; and the gating circuit is configured to pass the second clock signal to the RF DAC a time interval prior to a beginning of the stream of data.

Aspect 25: The apparatus of aspect 23 or 24, wherein: the stream of idle data follows a stream of data in the phy data signal; and the gating circuit is configured to gate the second clock signal from being applied to the RF DAC at a time interval after an end of the stream of data.

Aspect 26: An apparatus, comprising: a modem configured to generate a physical layer ("phy") data signal; an ultra-wideband (UWB) pulse generator configured to generate a UWB signal based on the phy data signal and a first clock signal, wherein the UWB signal comprises a set of significant bit groups; a set of radio frequency digital-to-analog converters (RF DACs) configured to generate a set of radio frequency (RF) signals based on the set of significant bit groups of the UWB signal and a second clock signal, respectively; an idle data detector configured to generate a set of control signals based on detecting a set of idle data stream in the set of significant bit groups, respectively; and a gating circuit configured to pass or gate the second clock signal to or from the set of RF DACs based on the set of control signals, respectively.

Aspect 27: The apparatus of aspect 26, wherein the idle data detector is configured to modify the set of control signals based on a time interval prior to a beginning of a set of data stream following the set of idle data stream in the set of significant bit groups, respectively.

Aspect 28: The apparatus of aspect 26 or 27, wherein the idle data detector is configured to modify the set of control signals based on a time interval after an end of a set of data stream preceding the set of idle data stream in the set of significant bit groups, respectively.

Aspect 29: The apparatus of any one of aspects 26-28, further comprising a signal combiner configured to combine the set of RF signals to generate an RF signal.

Aspect 30: The apparatus of aspect 29, further comprising: an RF front end configured to process the RF signal to generate a transmit RF signal; and at least one antenna configured to wirelessly radiate the transmit RF signal.

Aspect 31: An apparatus, comprising: means for generating a local oscillator (LO) clock signal; means for generating a radio frequency (RF) signal based on a data signal and the LO clock signal; means for detecting a stream of idle data in the data signal; and means for gating the LO clock signal to cease generating at least a portion of the RF signal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
a clock source configured to generate a local oscillator (LO) clock signal;
a radio frequency digital-to-analog converter (RF DAC) configured to generate a radio frequency (RF) signal based on a data signal and the LO clock signal; and
an idle data detector configured to:
detect a stream of idle data in the data signal, wherein the stream of idle data follows a stream of data in the data signal; and
provide a disable signal to the clock source to disable generating the LO clock signal in response to detecting the stream of idle data, wherein the idle data detector is configured to provide the disable signal at a time interval after an end of the stream of data.

2. The apparatus of claim 1, wherein the data signal comprises a transmit physical layer data signal.

3. The apparatus of claim 1, wherein the time interval is programmable.

4. The apparatus of claim 1, wherein the time interval is set to one or more unit intervals (UIs) of the data signal.

5. The apparatus of claim 1, wherein another stream of data in the data signal follows the stream of idle data, and wherein the idle data detector is configured to provide an enable signal to the clock source to generate the LO clock signal at a time interval prior to a beginning of the another stream of data.

6. The apparatus of claim 5, wherein the time interval is programmable.

7. The apparatus of claim 5, wherein the time interval is set to one or more unit intervals (UIs) of the data signal.

8. The apparatus of claim 1, wherein the data signal comprises a transmit physical layer data signal, and further comprising an ultra-wideband (UWB) pulse generator configured to generate a transmit UWB signal based on the transmit physical layer data signal and an oversampling clock signal.

9. The apparatus of claim 8, wherein the disable signal is further operative to disable providing the oversampling clock signal to the UWB pulse generator in response to detecting the stream of idle data.

10. The apparatus of claim 1, wherein the data signal comprises a transmit ultra-wideband (UWB) signal.

11. The apparatus of claim 1, wherein the data signal comprises a set of significant bit groups, wherein each of the significant bit groups includes one or more significant bits.

12. The apparatus of claim 11, wherein the RF DAC comprises:
a set of RF DACs configured to generate a set of RF signal portions based on the set of significant bit groups, respectively; and
a signal combiner configured to combine the set of RF signal portions to generate the RF signal.

13. The apparatus of claim 12, wherein the idle data detector is configured to: detect the stream of idle data in a first subset of one or more of the set of significant bit groups, wherein the disable signal is operative to disable generation of the LO clock signal for a first subset of one or more of the set of RF DACs corresponding to the first subset of one or more of the set of significant bit groups.

14. The apparatus of claim 13, wherein the idle data detector is configured to:
detect another stream of data in a second subset of one or more of the set of significant bit groups, wherein the another stream of data is concurrent with the stream of idle data; and
enable providing of the LO clock signal to a second subset of one or more of the set of RF DACs corresponding to the second subset of one or more of the set of significant bit groups.

15. A method, comprising:
generating a local oscillator (LO) clock signal;
generating a radio frequency (RF) signal based on a data signal and the LO clock signal;
detecting a stream of idle data in the data signal; and
gating the LO clock signal to cease generating at least a portion of the RF signal in response to detecting the stream of idle data, wherein the stream of idle data follows a stream of data in the data signal, and wherein gating the LO clock signal begins at a time interval after an end of the stream of data.

16. The method of claim 15, wherein another stream of data in the data signal follows the stream of idle data, and further comprising ungating the LO clock signal to generate the at least portion of the RF signal at a time interval before a beginning of the another stream of data.

17. The method of claim 15, wherein:
the data signal comprises a set of significant bit groups, wherein each of the significant bit groups includes one or more significant bits; and
generating the RF signal comprises:
generating a set of RF signal portions based on the set of significant bit groups, respectively; and
combining the set of RF signal portions to generate the RF signal.

18. The method of claim 17, wherein gating the LO clock signal to cease generating the at least the portion of the RF signal, comprises:
detecting the stream of idle data in one or more of the set of significant bit groups; and
gating the LO clock signal to cease generating one or more of the set of RF signal portions based on the one or more of the set of significant bit groups in which the stream of idle detected has been detected.

19. An apparatus, comprising:
a modem configured to generate a physical layer ("phy") data signal;
an ultra-wideband (UWB) pulse generator configured to generate a UWB signal based on the phy data signal and a first clock signal;
a radio frequency digital-to-analog converter (RF DAC) configured to generate a radio frequency (RF) signal based on the UWB signal and a second clock signal;
a gating circuit configured to gate the second clock signal from being applied to the RF DAC in response to a pattern in the phy data signal, wherein the gating circuit is further configured to gate the first clock signal from being applied to the UWB pulse generator in response to the pattern in the phy data signal; and
an idle data detector configured to detect the pattern in the phy data signal, wherein the pattern includes a stream of idle data, wherein:
a stream of data in the phy data signal follows the stream of idle data; and
the gating circuit is configured to pass the second clock signal to the RF DAC at a time interval prior to a beginning of the stream of data.

20. The apparatus of claim 19, wherein:

the stream of idle data follows a stream of data in the phy data signal; and the gating circuit is configured to gate the second clock signal from being applied to the RF DAC at another time interval after an end of the stream of data.

21. An apparatus, comprising:

a modem configured to generate a physical layer ("phy") data signal;

an ultra-wideband (UWB) pulse generator configured to generate a UWB signal based on the phy data signal and a first clock signal, wherein the UWB signal comprises a set of significant bit groups;

a set of radio frequency digital-to-analog converters (RF DACs) configured to generate a set of radio frequency (RF) signals based on the set of significant bit groups of the UWB signal and a second clock signal, respectively;

an idle data detector configured to generate a set of control signals based on detecting a set of idle data stream in the set of significant bit groups, respectively; and a gating circuit configured to pass or gate the second clock signal to or from the set of RF DACs based on the set of control signals, respectively, wherein the idle data detector is configured to modify the set of control signals based on a time interval prior to a beginning of a set of data stream following the set of idle data stream in the set of significant bit groups, respectively.

22. The apparatus of claim 21, wherein the idle data detector is configured to modify the set of control signals based on a time interval after an end of a set of data stream preceding the set of idle data stream in the set of significant bit groups, respectively.

23. The apparatus of claim 21, further comprising a signal combiner configured to combine the set of RF signals to generate an RF signal.

24. The apparatus of claim 23, further comprising:

an RF front end configured to process the RF signal to generate a transmit RF signal; and at least one antenna configured to wirelessly radiate the transmit RF signal.

* * * * *